United States Patent
Chauville et al.

(10) Patent No.: US 7,463,293 B2
(45) Date of Patent: *Dec. 9, 2008

(54) METHOD AND SYSTEM FOR CORRECTING CHROMATIC ABERRATIONS OF A COLOR IMAGE PRODUCED BY AN OPTICAL SYSTEM

(75) Inventors: Benoit Chauville, Paris (FR); Frederic Guichard, Paris (FR); Jean-Marc Lavest, Clermont-Ferrand (FR); Bruno Liege, Paris (FR)

(73) Assignee: DO Labs, Boulogne (FR)

( * ) Notice: Subject to any disclaimer, the term of this patent is extended or adjusted under 35 U.S.C. 154(b) by 570 days.

This patent is subject to a terminal disclaimer.

(21) Appl. No.: 10/483,253

(22) PCT Filed: Jun. 5, 2002

(86) PCT No.: PCT/FR02/01913

§ 371 (c)(1),
(2), (4) Date: May 26, 2004

(87) PCT Pub. No.: WO03/007592

PCT Pub. Date: Jan. 23, 2003

(65) Prior Publication Data

US 2004/0218071 A1 Nov. 4, 2004

(30) Foreign Application Priority Data

| Jul. 12, 2001 | (FR) | 01 09291 |
| Jul. 12, 2001 | (FR) | 01 09292 |
| Oct. 2, 2001 | (FR) | 01 12664 |

(51) Int. Cl.
- *H04N 5/217* (2006.01)
- *H04N 9/093* (2006.01)
- *G06K 5/00* (2006.01)
- *G06K 9/40* (2006.01)

(52) U.S. Cl. ............ 348/241; 348/263; 358/3.26; 382/275; 353/69

(58) Field of Classification Search ............ 348/241, 348/222.1, 263; 382/275, 284, 294, 295; 358/3.26; 355/52; 353/69, 70

See application file for complete search history.

(56) References Cited

U.S. PATENT DOCUMENTS 5,276,519 A 1/1994 Richards et al.

(Continued)

FOREIGN PATENT DOCUMENTS

EP 0 595 301 5/1994

(Continued)

OTHER PUBLICATIONS

Fujita et al.; "A Compact, high-Performance HDTV Camera with Four-CCD Chips"; Jun. 1995; IEEE Transactions on Broadcasting; vol. 41, No. 2; pp. 76-82.*

(Continued)

*Primary Examiner*—John M Villecco
(74) *Attorney, Agent, or Firm*—Oblon, Spivak, McClelland, Maier & Neustadt, P.C.

(57) ABSTRACT

A system and a method for correcting chromatic aberrations of a color image composed of a plurality of digitized color planes. The color image is assumed to have been produced by an optical system. According to the system and method, geometric anomalies of the digitized color planes are modeled and corrected, at least partly, in such a way to obtain corrected digitized color planes. The corrected digitized color planes are then combined to obtain a color image corrected completely or partly for the chromatic aberrations. The system and method are applicable to photographic or video image processing, in optical devices, industrial controls, robotics, metrology, etc.

5 Claims, 9 Drawing Sheets

U.S. PATENT DOCUMENTS

| | | | | |
|---|---|---|---|---|
| 5,353,056 | A * | 10/1994 | Westerink et al. | 348/263 |
| 5,369,450 | A * | 11/1994 | Haseltine et al. | 348/745 |
| 5,675,380 | A * | 10/1997 | Florent et al. | 348/247 |
| 5,751,863 | A * | 5/1998 | Farr | 348/241 |
| 6,219,446 | B1 | 4/2001 | Kiriki et al. | |
| 6,538,691 | B1 * | 3/2003 | Macy et al. | 348/222.1 |
| 6,603,885 | B1 * | 8/2003 | Enomoto | 382/263 |
| 6,618,081 | B1 * | 9/2003 | Harada et al. | 348/241 |
| 6,816,625 | B2 * | 11/2004 | Lewis et al. | 358/3.26 |
| 6,819,333 | B1 * | 11/2004 | Sadowski | 345/647 |
| 7,280,707 | B2 * | 10/2007 | Perlmutter et al. | 382/294 |
| 2002/0196472 | A1 * | 12/2002 | Enomoto | 358/3.26 |
| 2006/0239549 | A1 * | 10/2006 | Kelly et al. | 382/167 |

FOREIGN PATENT DOCUMENTS

| | | |
|---|---|---|
| EP | 0 878 970 | 11/1998 |

OTHER PUBLICATIONS

Boult et al.; "Correcting Chromatic Aberrations Using Image Warping"; Jun. 15-18, 1992; IEEE Computer Society Conference on Computer Vision and Pattern Recognition; Proceedings CVPR '92; pp. 684-687.*

Rebiai et al.; "Image Distortion From Zoom Lenses: Modeling and Digital Correction"; Jul. 3-7, 1992; International Broadcasting Convention 1992. IBC; pp. 438-441.*

Reg G. Wilson, "Modeling and calibration of automated zoom lenses"; Oct. 1994; Proceedings of SPIE, vol. 2350, pp. 170-186.*

U.S. Appl. No. 10/482,413, filed Jan. 12, 2004, Liege et al.
U.S. Appl. No. 10/483,253, filed Jan. 12, 2004, Chauville et al.
U.S. Appl. No. 10/482,419, filed Jan. 12, 2004, Chauville et al.
U.S. Appl. No. 10/483,252, filed Jan. 12, 2004, Chauville et al.
U.S. Appl. No. 10/483,322, filed Jan. 12, 2004, Liege et al.
U.S. Appl. No. 10/483,495, filed Jan. 12, 2004, Chanas et al.
U.S. Appl. No. 10/483,496, filed Jan. 12, 2004, Chanas et al.
U.S. Appl. No. 10/483,494, filed Jan. 12, 2004, Liege et al.
U.S. Appl. No. 10/483,497, filed Jan. 12, 2004, Liege et al.

* cited by examiner

FIG_1

FIG_2

FIG_3

FIG_5

FIG_6a

FIG_6b

FIG_6c

FIG_7

FIG_8

FIG_9

METHOD AND SYSTEM FOR CORRECTING CHROMATIC ABERRATIONS OF A COLOR IMAGE PRODUCED BY AN OPTICAL SYSTEM

BACKGROUND OF THE INVENTION

Field of the Invention

The present invention relates to a method and a system for correcting the chromatic aberrations of a color image produced by means of an optical system.

BRIEF SUMMARY OF THE INVENTION

Method

The invention relates to a method for correcting the chromatic aberrations of a color image composed of a plurality of digitized color planes. The color image was produced by means of an optical system. The method includes the following stages:

- the stage of modeling and correcting, at least partly, the geometric anomalies of the digitized color planes, in such a way as to obtain corrected digitized color planes,
- the stage of combining the corrected digitized color planes, in such a way as to obtain a color image corrected completely or partly for the chromatic aberrations.

Preferably, according to the invention, the method includes the stage of modeling and correcting, at least partly, the geometric anomalies composed of deviations between the geometric defects, especially distortion, of the digitized color planes, in such a way as to obtain corrected digitized color planes. Thus it is possible to establish a correspondence between the corrected digitized color planes. The method additionally includes the stage of combining the corrected digitized color planes in such a way as to obtain a color image corrected completely or partly for the chromatic aberrations.

Preferably, according to the invention, the method includes the stage of modeling and correcting, at least partly, the geometric anomalies composed of distortion defects of the digitized color planes, in such a way as to obtain corrected digitized color planes. Thus it is possible to establish a correspondence between the corrected digitized color planes. The method additionally includes the stage of combining the corrected digitized color planes in such a way as to obtain a color image corrected completely or partly for the chromatic aberrations and the distortion defects.

System

The invention also relates to a system for correcting the chromatic aberrations of a color image composed of a plurality of digitized color planes. The color image was produced by means of an optical device. The system comprises:

- first calculating means for modeling and correcting the geometric anomalies of the digitized color planes, in such a way as to obtain corrected digitized color planes,
- second calculating means for combining the corrected digitized color planes, in such a way as to obtain a color image corrected completely or partly for the chromatic aberrations.

Preferably, according to the invention, the system includes first calculating means for modeling and correcting, at least partly, the geometric anomalies composed of deviations between the geometric defects, especially distortion, of the digitized color planes, in such a way as to obtain corrected digitized color planes. Thus it is possible to establish a correspondence between the corrected digitized color planes. The system additionally includes second calculating means for combining the corrected digitized color planes in such a way as to obtain a color image corrected completely or partly for the chromatic aberrations.

Preferably, according to the invention, the color image was produced by means of an optical device system. The system includes first calculating means for modeling and correcting, at least partly, the geometric anomalies composed of distortion defects of the digitized color planes, in such a way as to obtain corrected digitized color planes. Thus it is possible to establish a correspondence between the corrected digitized color planes. The system additionally includes second calculating means for combining the corrected digitized color planes in such a way as to obtain a color image corrected completely or partly for the chromatic aberrations and the distortion defects.

BRIEF DESCRIPTION OF THE SEVERAL VIEWS OF THE DRAWINGS

Other characteristics and advantages of the invention will become apparent upon reading of the description of alternative embodiments of the invention, provided by way of indicative and non-limitative examples, and of FIG. 1, which illustrates a first alternative embodiment of a system according to the invention, designed more particularly to correct the chromatic aberrations and the distortion defects, FIG. 2, which illustrates a second alternative embodiment of a system according to the invention, designed more particularly to correct the chromatic aberrations, FIGS. 3 to 7, which illustrate a third alternative embodiment of a system according to the invention, designed more particularly to correct the chromatic aberrations and the distortion defects, FIG. 8, which illustrates a practical example of a system according to the invention, FIG. 9, which illustrates a second practical example of a system according to the invention.

DETAILED DESCRIPTION OF THE INVENTION

Figure 1:
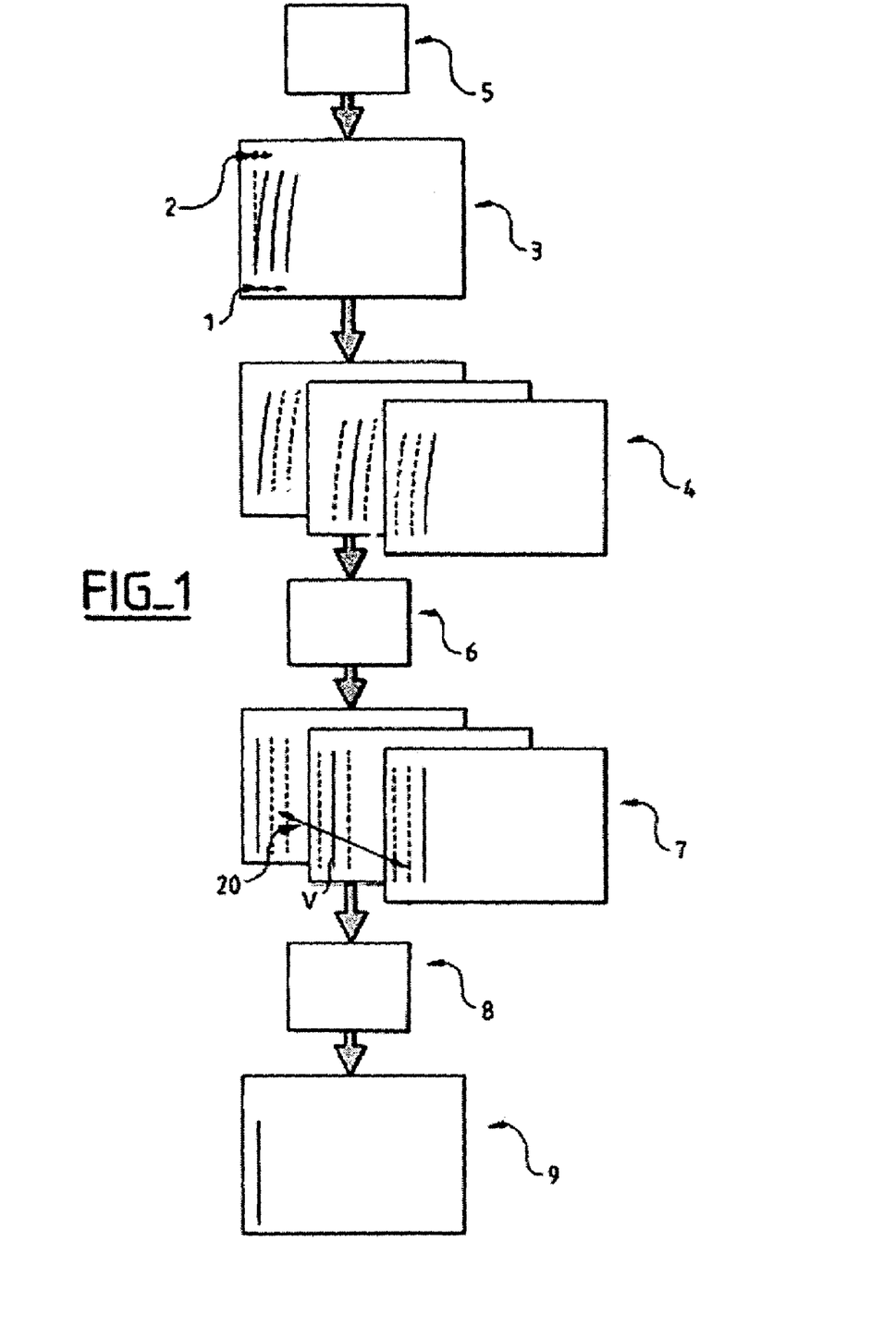

Referring to FIG. 1, a description will now be given of the first alternative embodiment.

In the case of the first alternative embodiment, the system is designed more particularly to correct the chromatic aberrations 1 and the distortion defects 2 of a color image 3 composed of a plurality of digitized color planes 4. Color image 3 was produced by means of an optical system 5.

The system includes first calculating means 6 for modeling and correcting, at least partly, the distortion defects 2 of digitized color planes 4, in such a way as to obtain corrected digitized color planes 7. Thus it is possible to establish a correspondence 20 between corrected digitized color planes 7.

The system additionally includes second calculating means 8 for combining corrected digitized color planes 7, in such a way as to obtain a color image 9 corrected completely or partly for the chromatic aberrations 1 and the distortion defects 2.

Figure 2:
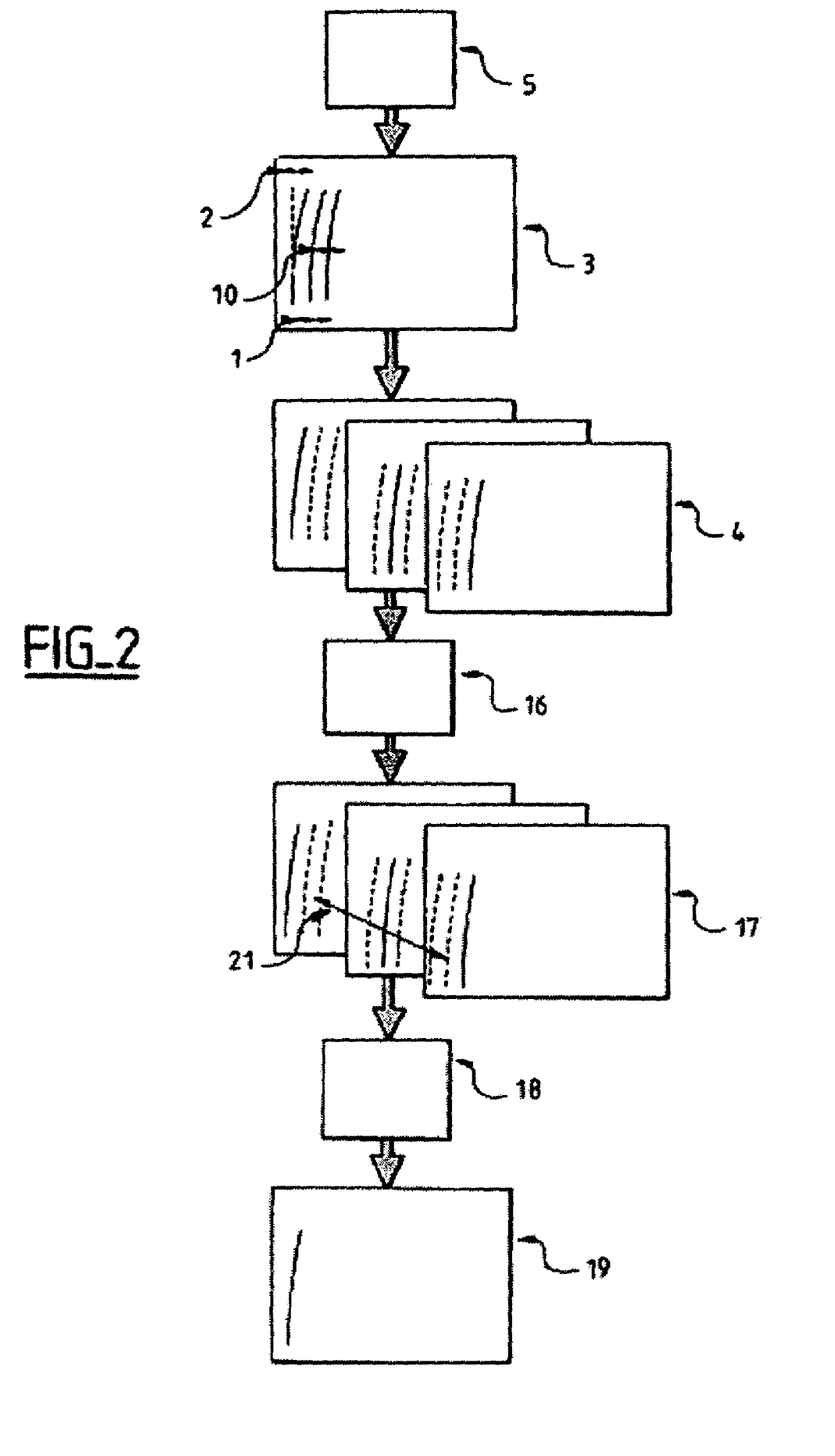

Referring to FIG. 2, a description will now be given of the second alternative embodiment.

In the case of the second alternative embodiment, the system is designed more particularly to correct the chromatic aberrations. As in the case of the first alternative embodiment, color image 3 was produced by means of an optical system 5.

The system includes first calculating means 16 for modeling and correcting, at least partly, the deviations 10 between the distortion defects 2 of digitized color planes 4, in such a way as to obtain corrected digitized color planes 17. Thus it is possible to establish a correspondence 21 between corrected digitized color planes 17.

The system additionally includes second calculating means 18 for combining the corrected digitized color planes 17, in such a way as to obtain a color image 19 corrected completely or partly for the chromatic aberrations 1.

In the case of a third alternative embodiment, the system is more particularly designed to correct the chromatic aberrations of a color image composed of digitized color planes. We will present a detailed explanation of a practical example that includes the stage of modeling and correcting the geometric anomalies, such as distortion, of the digitized color planes, in such a way as to obtain corrected digitized color planes, and the stage of combining the corrected digitized color planes, in order to obtain a color image corrected for the chromatic aberrations. The color image is produced by means of an optical system which, in the described example, comprises capturing or restituting the color image by means of an appliance and/or of an appliance chain.

Modeling

Figure 3:
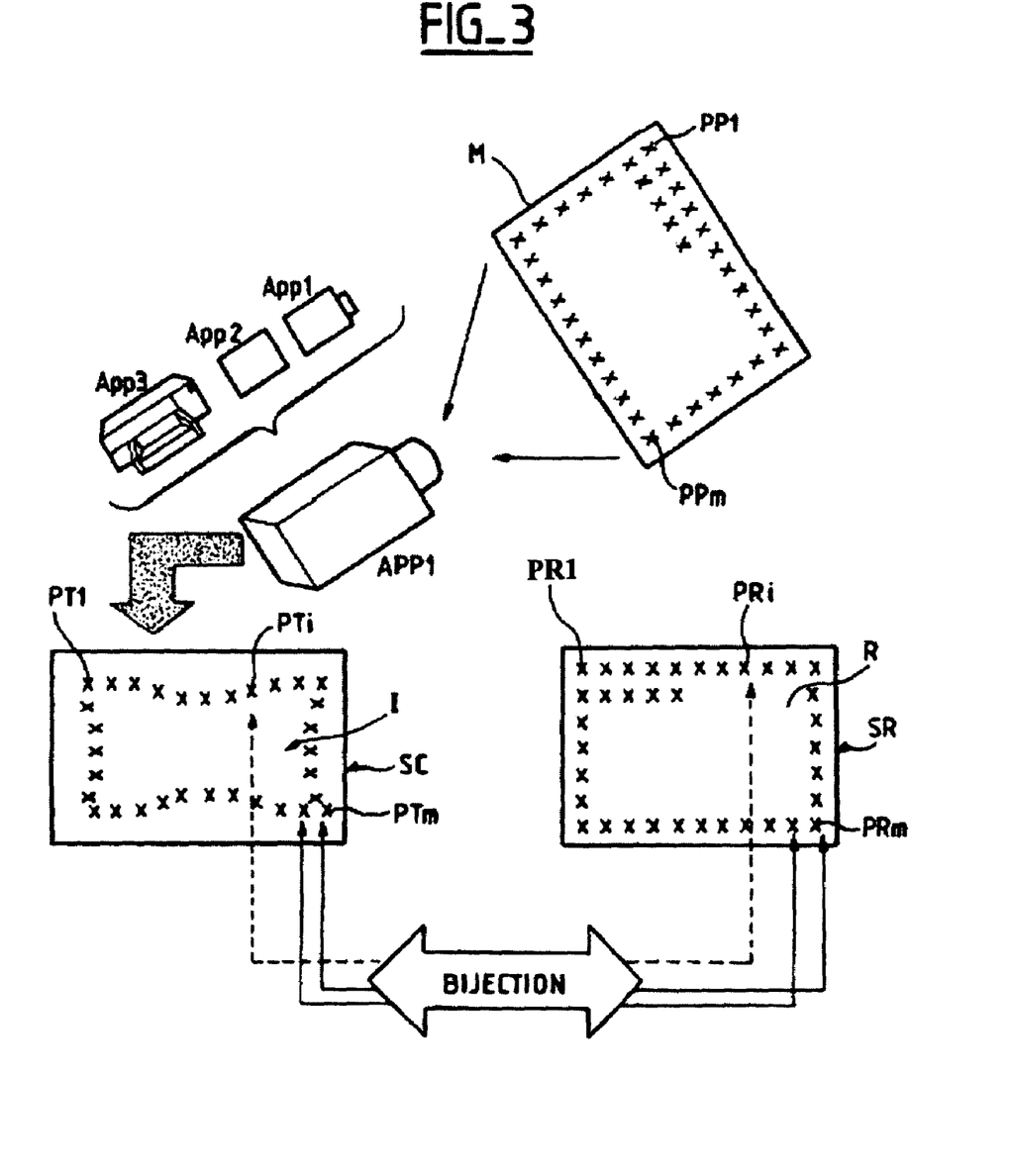

FIG. 3 illustrates a precise description of an example of implementation of the system of the invention and of the method employed. First of all we shall attempt to describe an example of a modeling process dedicated exclusively to the distortion defects of image I that correspond to one digitized color plane. The approach will then be applied to color images, then permitting modeling and correction of chromatic and/or geometric aberrations. The process described in FIG. 3 employs:

- a universal set M, which may be a reference scene,
- a medium SC containing an image I. In the case of an image-capture system, surface SC may be that of a sensor (such as a CCD) or, in the case of an image-restitution system, this surface may be that of a projection screen or that of a paper sheet of a printer.
- a virtual reference surface SR containing a virtual reference R or a virtual reference image, which if necessary may be a synthetic image.

By means of an appliance APP1 or of an appliance chain, image I is obtained, from universal set M, on a medium SC, keeping only one digitized color plane. An appliance chain is a set of appliances with which an image can be obtained. For example, an appliance chain App1/App2/App3 will be able to include an image-capture appliance, a scanner, a printing appliance, etc.

Image I therefore contains defects and, in particular, distortion defects related to these appliances.

Virtual reference R is deduced directly from M, and must be regarded as perfect or quasi-perfect. It may be identical or quasi-identical to M, or instead may exhibit differences, as will be seen farther on.

As an example, we can explain the relationship between M and R as follows: To points PP1 to PPm of universal set M there correspond reference points PR1 to PRm in virtual reference R of reference surface SR as well as characteristic image points PT1 to PTm of image I of medium SC.

According to a practical example of the method of the invention, there is therefore provided a stage of modelling of defects from image I, which has been captured and/or restituted by means of the appliance or of appliance chain APP1.

In the course of a subsequent stage, there is chosen a certain number of points PTi, PRi. These points are chosen in limited numbers and are situated in characteristic zones of universal set M, of image I and of virtual reference R. A bijection is then established between the points PTi of the image and the points PRi of the virtual reference. Thus, to each chosen point PTi there is made to correspond a corresponding point PRi, and vice versa.

For an image, it is possible to obtain a measured field with which it will be possible to produce measured formatted information.

Figure 4A:
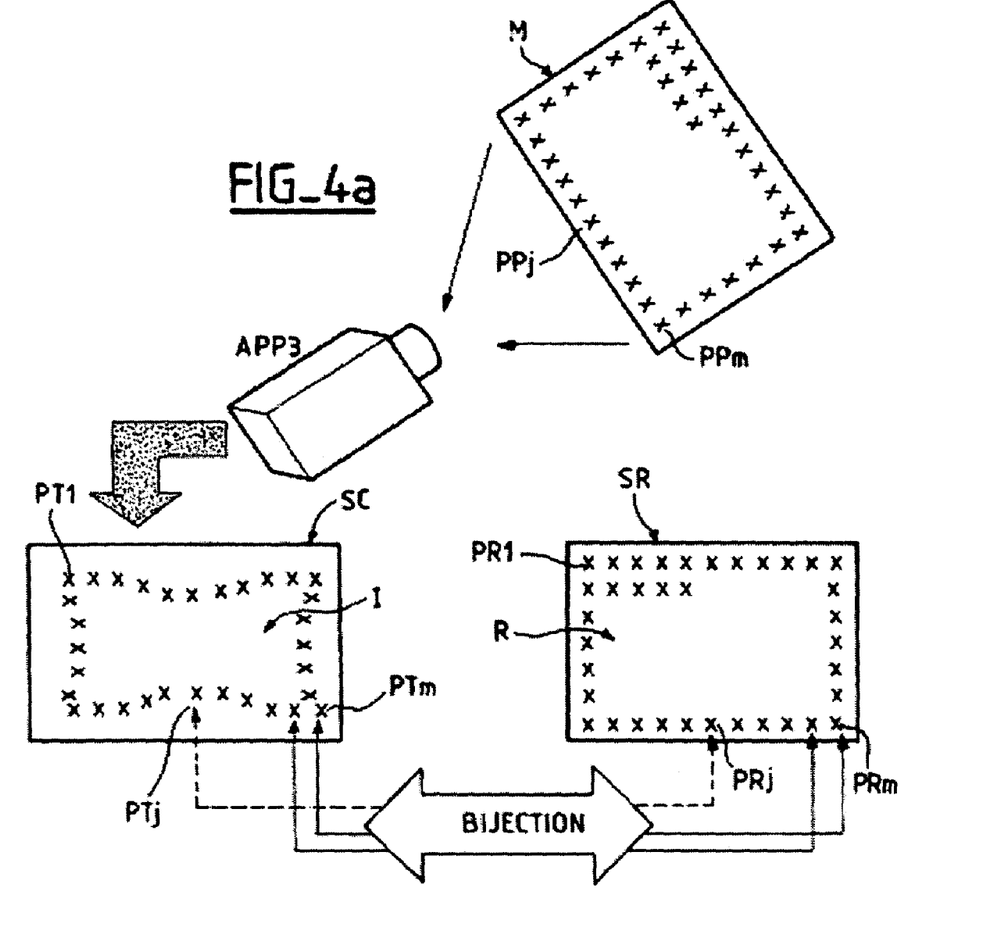

FIG. 4a illustrates a possible form of obtaining a measured field. This figure shows universal set M, reference surface SR and medium SC. Image I is constructed on medium SC by means of an appliance APP3. Then the bijection described in the foregoing is applied. A mathematical projection H, preferably a bilinear transformation, is then established between a point of medium SC and a point of reference surface SR.

Figure 4B:
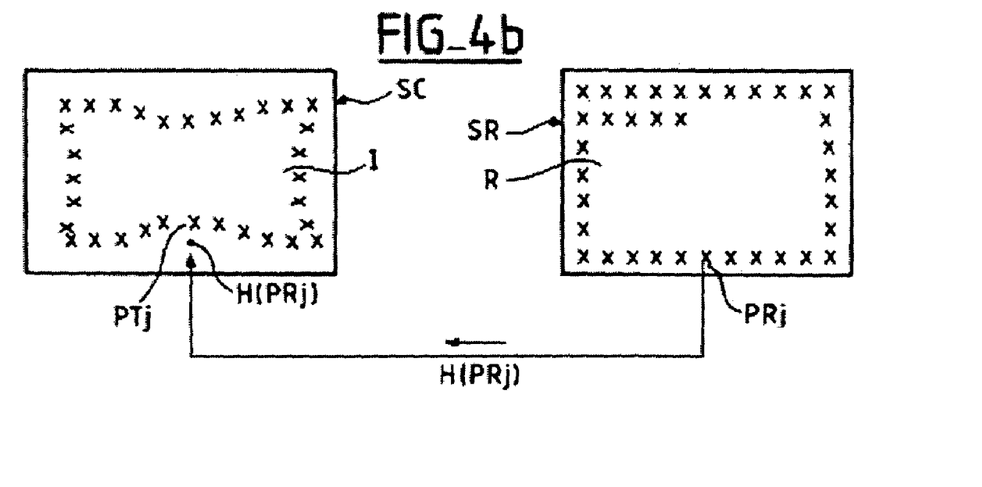

In FIG. 4b it is seen that, for each point PRj of the reference surface, there can be obtained a point H(PRj) of the image by mathematical projection. Preferably, for two points PRj and PTj of a pair associated by bijection, there will be a point H(PRj), the mathematical projection of PRj onto medium SC.

A measured field therefore contains:

for different reference points PR, the mathematical projection H(PRj) of the reference point PRj onto medium SC, thus providing a new point H(PRj) associated with the corresponding point PTj by bijection. Thus, in the measured field, there exists a series of pairs of points associated by bijection, wherein one point in each pair is the mathematical projection of the other point of the pair.

It will also be possible for the measured field of an image to be composed of any other type of association that links the points PR, PT, H(PR) and H(PT).

It is possible but not necessary to choose variable characteristics of the appliance APP3 (or of the appliance chain) among those used to obtain image I with appliance APP3. The variable characteristics of an appliance or of an appliance chain can include the focal length of the optical system of an appliance, the focus, the aperture, the number of the photo in a set of photos, the digital zoom, and the characteristics of partial capture of an image ("crop" in English terminology), etc.

With this measured field for image I, there is composed a set of measured formatted information IFM. An item of measured formatted information of a point PTj will therefore include, according to the foregoing example:

- the fixed characteristics of the appliance or appliances being used;
- the chosen variable characteristics;
- the X, Y position of point PTj in the image;
- the mathematical projection of the corresponding point PRj by bijection.

Parameterizable Model

The use of the system will lead to the need to process a large number of points and thus a large volume of measured formatted information. To make operation of the system more flexible, to accelerate processing and/or to be resistant to measurement errors, the method provides for deducing, from items of measured formatted information IFMl to IFMm, items of extended formatted information IFEl to IFEm belonging to a surface (or a hypersurface) that can be represented by a function chosen within a space of finite dimension, such as a polynomial of limited order chosen among the class of polynomials of finite degree, or a spline function of appropriate degree, or any other approximation function.

In the foregoing, it has been seen that formatted information could contain variable characteristics. In fact, a combination of variable characteristics, such as a combination of focal length, focusing, diaphragm aperture, capture speed, aperture, etc., may be involved.

Under these conditions, the system will be able, during processing of an image, to use, instead of resorting to a large volume of measured and/or extended formatted information, a parameterizable interpolation and/or extrapolation model estimated from measured and/or extended formatted information for arguments composed of combinations of known variable characteristics.

Arbitrary Point

For an arbitrary point, it is sufficient, for example, to reinject the argument (X, Y, focal length, distance, aperture, iso, speed, flash, etc.) related to this point into the parameterizable model in order to find the formatted information related to the said point X, Y, and by virtue of this fact to return to the case of an appliance without variable parameter. By means of the formatted information related to the said argument, it is possible to determine, for example, the point homologous with X, Y and to suppress all or part of the defect.

Bilinear Transformation

Figure 5:
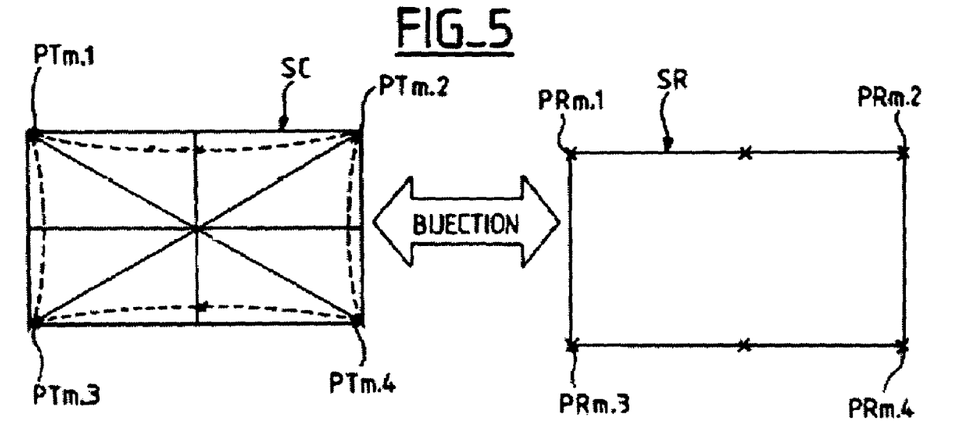

An effective way of calculating the mathematical projection between reference surface SR and medium surface SC may be achieved, for example, by choosing, on medium SC and on reference surface SR, four points PTm1 to PTm4 and PRm1 to PRm4 that correspond by bijection and that, for example, are at the peripheral limits of medium SC and of reference surface SR. The positions of these points are chosen, for example, in such a way as to maximize the areas included between these points.

In addition, as illustrated in FIG. 5, the positions of these points are such that the intersection of the diagonals of the quadrilaterals defined by these points is located at the center or close to the center of the quadrilaterals.

There is then calculated a mathematical projection, especially a bilinear transformation, for example, with which the four characteristic points PTm.1 to PTm.4 can be transformed to the four reference points PRm.1 to PRm.4. This mathematical projection will be associated with the formatted information of the image.

Color Images

Referring to FIGS. 6a to 6d, a description will be given of methods for calculating formatted information related to color images. A color image can be regarded as being composed of a plurality of monochromatic images, each corresponding to one color plane of the color image. Traditionally, it can be considered that a color image is a trichromatic image composed of three monochromatic images (red, green, blue). It is known in optics that the distortions induced by the optical systems and the light-transmission media induce different effects on the different wavelengths. In a trichromatic image, the same physical defect of an appliance will therefore induce different distortions on the image being transported by light of wavelength close to red, on that being transported by light of wavelength close to green, and on that being transported by light of wavelength close to blue.

Figure 6A:
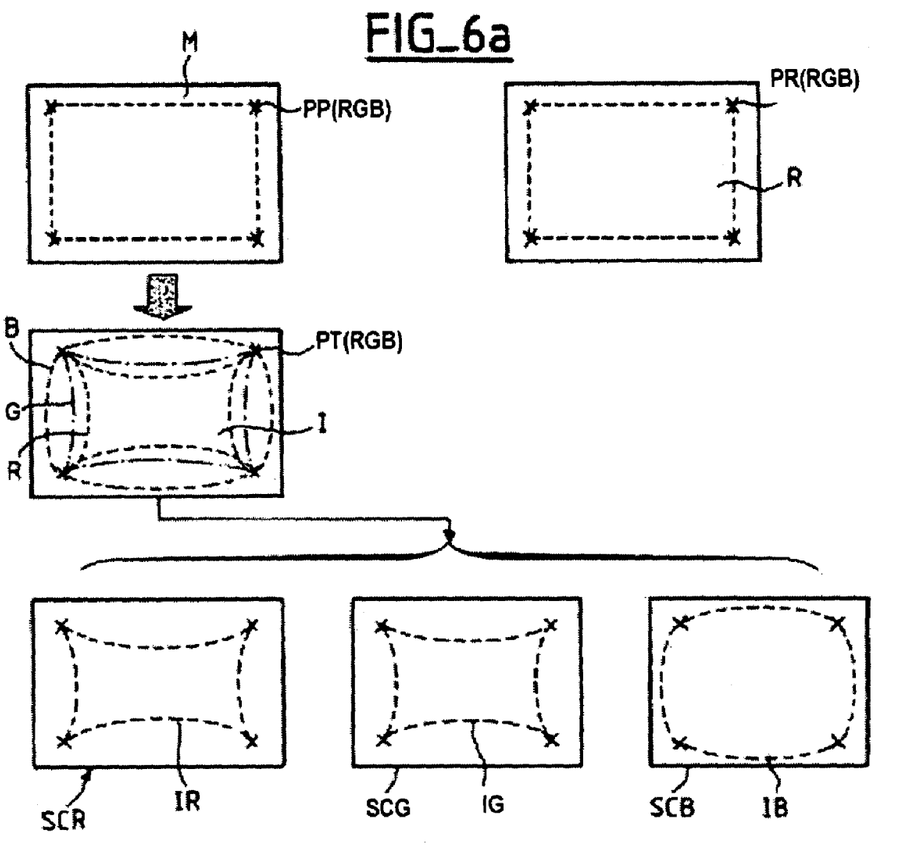

As illustrated in FIG. 6a, starting from a trichromatic universal set M, to which there corresponds a quasi-identical virtual reference R, there will correspond, in image I, three superposed images IR, IG and IB, which have been illustrated separately on the planes SCR, SCG and SCB. The three images IR, IG and IB exhibit different distortions, leading to a trichromatic image that exhibits both geometric distortion and chromatic aberrations.

Figure 6B:
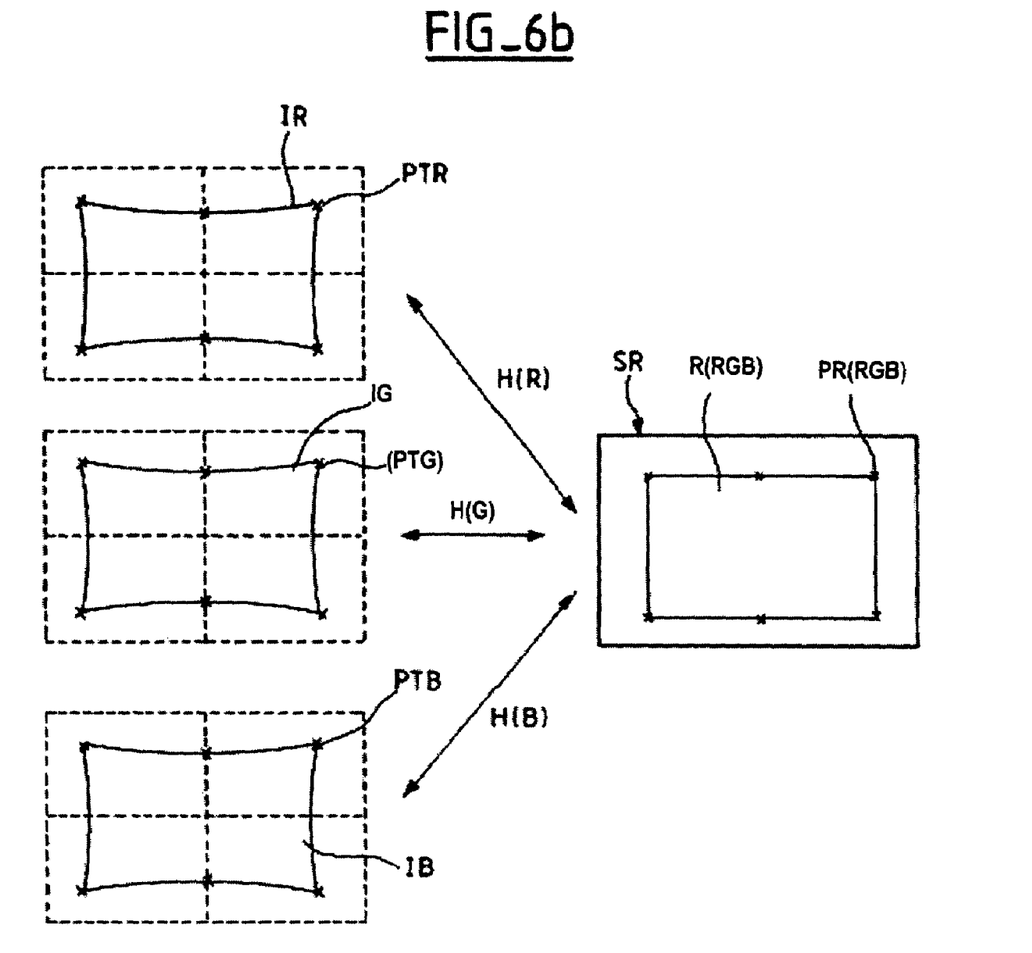

FIG. 6b illustrates the principle of the method and system with which there can be obtained formatted information that will permit image-processing software to correct distortions and/or chromatic aberrations.

According to this method, one item of formatted information per color will be calculated for each trichromatic point of the image. It will therefore be considered that it is appropriate to correct as many monochromatic images as there are colors. In the trichromatic example, the calculations will be performed as if there were three images to be corrected.

For calculation of the formatted information of the three images IR, IG and IB, there are used the same methods as those described in relation to FIGS. 3 to 5.

FIG. 6b illustrates surface SR with a virtual reference R containing trichromatic points PR(RGB) and also illustrates the decomposition of image I into three monochromatic images IR, IG, IB, each containing the points PTR, PTG, PTB of a single color.

One way of calculating the formatted information related to a trichromatic point is to use the same virtual reference R for the three color planes. Thus three mathematical projections are used: a mathematical projection HR for red point PTR, a mathematical projection HG for green point PTG and a mathematical projection HB for blue point PTB, as illustrated in FIG. 6b.

Figure 6C:
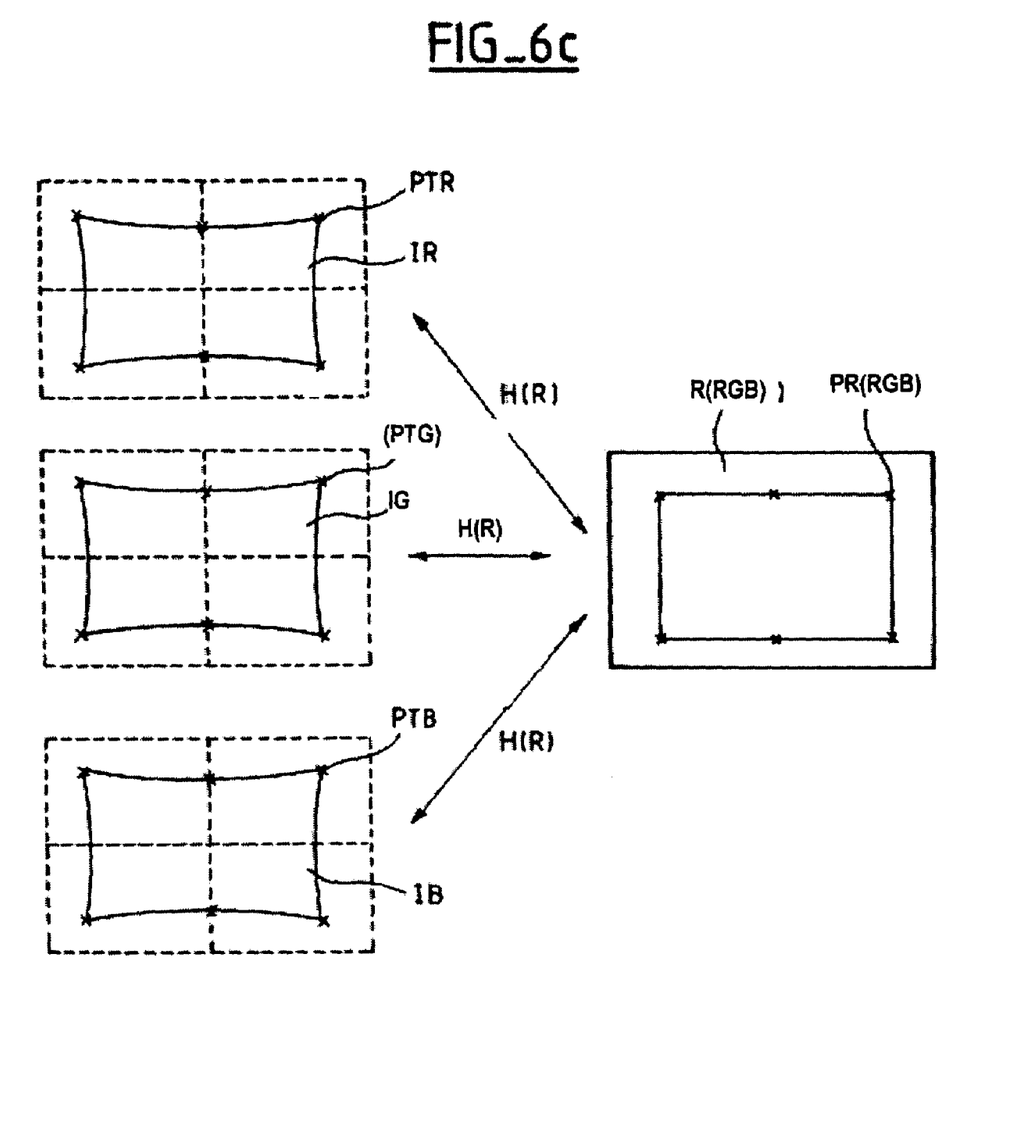

As shown in FIG. 6c, another approach is to use the same virtual reference R and to calculate formatted information for each color plane by using the same mathematical projection, defined optionally, onto one of the color planes. For example, only the mathematical projection HR related to the red point is calculated. This mathematical transformation is then applied to the three red, green and blue points to calculate the formatted information of these three points. In this case, it will be possible for image-processing software to correct both the geometric distortions and the chromatic aberrations of the image. The combination of corrected color planes is achieved by simple superposition, since virtual reference R and mathematical projection HR are common to the color planes.

Figure 6D:
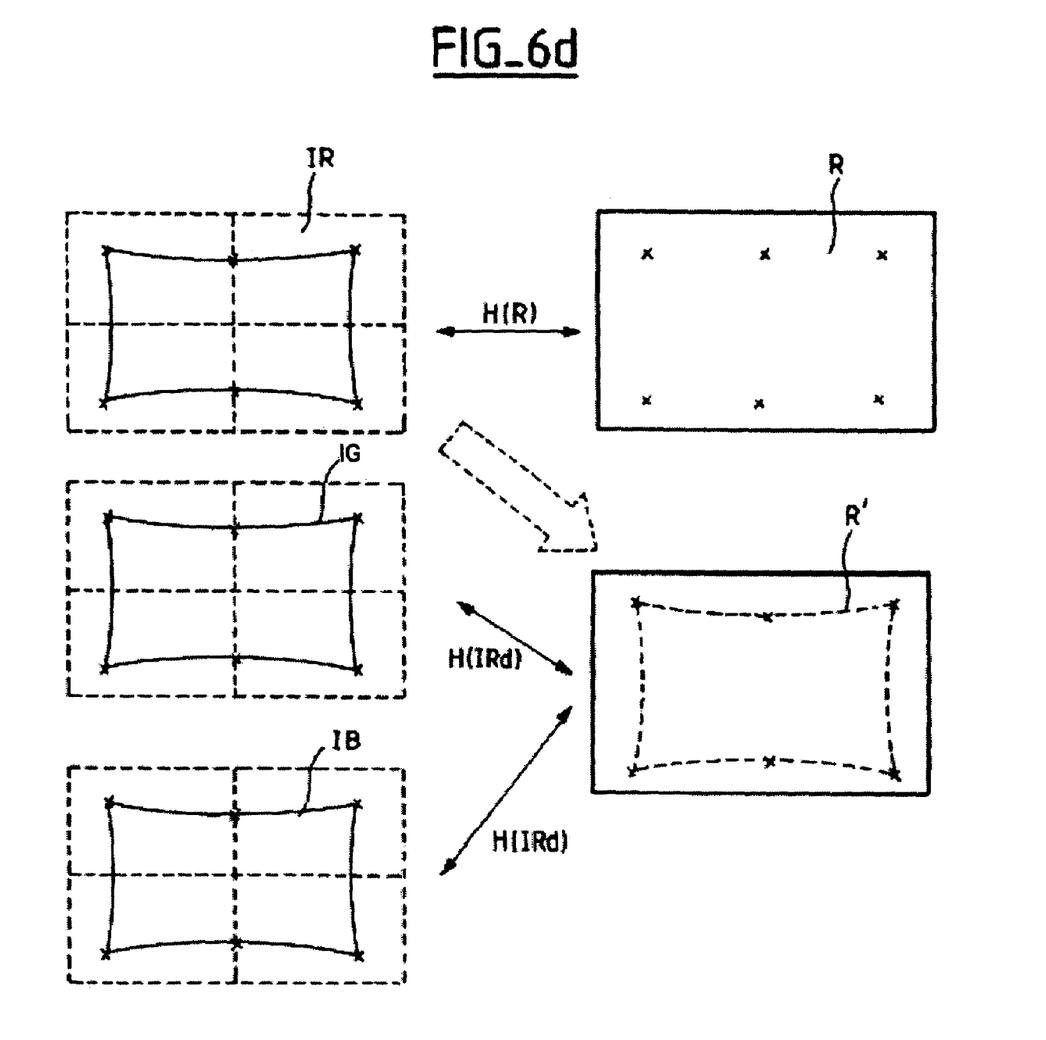

Another approach, illustrated by FIG. 6d, comprises:

For the image of a specified color, such as the red image IR, calculating the formatted information by using a virtual reference R assumed to be perfect and a mathematical projection H(R) of the points of the virtual reference onto the surface of the red image IR, thus making it possible to correct the distortions of the red image.

For the images of the other colors, such as the green and blue images IG and IB, using the foregoing color image—the red image IR according to the adopted example—as virtual reference R' and undertaking the same mathematical projection H(IRd) of the points of this red image onto the surfaces of the green image IG and then blue image IB. Preferably, this mathematical projection will be an identity (or identity projection) of the points of the red image onto the green and blue images. In this way it will be possible to suppress the differences (chromatic aberrations) between the red, green and blue images. The formatted information of the points of the green and blue images will be able to contain the mathematical projection of the points of virtual reference R onto the red image as well as the mathematical projections (identity) of the red image onto the green and blue images respectively. This approach may make it possible, as the case may be, to correct the chromatic aberrations alone by using only the formatted information related to the green and blue images. The combination of corrected color planes is achieved by simple superposition, since virtual reference R and mathematical projection HR are common to the color planes.

In the foregoing, it was considered that virtual reference R was quasi-identical to universal set M. If it is considered that virtual reference R is exactly identical to universal set M, it will be possible to calculate formatted information that will make it possible to correct image I so that it is the exact replica of universal set M.

Figure 7:
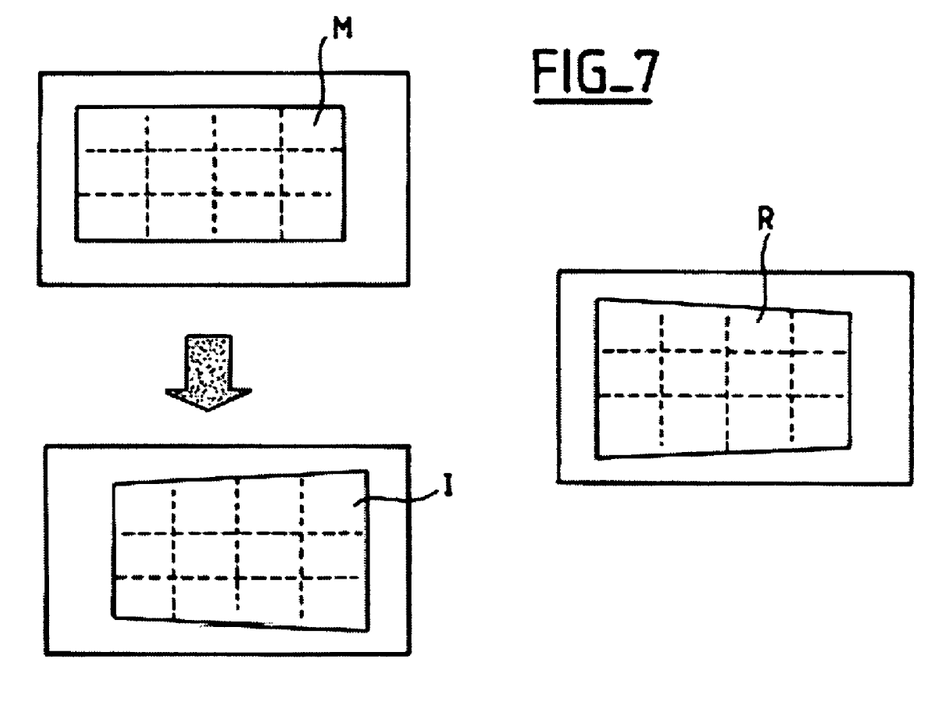

As illustrated in FIG. 7, it may be provided that virtual reference R is deformed compared with universal set M. For example, the virtual reference has a trapezoidal shape, whereas universal set M has a rectangular shape. The formatted information that will be obtained will make it possible to correct image I to induce a trapezoidal deformation on the corrected image. An example of application of such an arrangement exists in overhead projectors, where it will be possible to correct the well-known deformation induced by these appliances during projection because of the fact that the axis of the projection beam is not perpendicular to the plane of the screen.

It is also possible to deform the virtual reference by distortions, to induce characteristics and even defects obtained with appliances other than those obtained by the appliances with which construction of image I was possible. As an example, it will be possible to induce, in the virtual reference, characteristics of improved appliances or alternatively of old appliances, to impart a particular appearance to the corrected image. The formatted information, the measured formatted information or the extended measured formatted information obtained with such a virtual reference incorporate the distortions that were induced in the virtual reference, in such a way that the formatted information and/or the measured formatted information can be used by software for processing images captured by a first image-capture appliance to obtain images whose quality, in terms of distortions and/or chromatic aberrations, is comparable to that of a second image-capture appliance. This technique is also applicable to image restitution, by considering that image-processing software can then restitute, by means of a first restitution appliance, an image whose quality, in terms of distortions and/or chromatic aberrations, is comparable to that provided by a second restitution appliance.

In the foregoing description, it was considered that the image is composed of points and that the processing operations of the described methods are applied to points. Without departing from the scope of the invention, however, the described methods could process sets of points forming elements and representing patterns (lozenges, etc.).

In the case in which the appliance or the appliance chain possesses a variable characteristic that may have only a reduced number of discrete values (three discrete values of focal length, for example), it will be of interest, in terms of precision, to employ, according to the adopted example, the process with fixed focal length three times rather than to use a polynomial surface corresponding to an approximation that could include the focal length as parameter.

The field of application of the device can cover the field of application related to image quality, its being understood that the quality of images can be measured in terms, among other factors, of the residual distortion and/or chromatic aberrations that they contain. The invention is also applicable to the art of measurement based on vision by computer, known by the expression "vision metrology".

If the method is employed in the case of an appliance chain containing a plurality of appliances, such as a projector and a photo appliance, or such as a printer and a scanner, and if one of the appliances, for example the photo appliance or the scanner, exhibits zero or little distortion defect and/or chromatic aberration, the method produces formatted information related solely to the other appliance. This is the case of a practical method for producing formatted information related to an image-restitution appliance by using an image-capture appliance which is free of defects or whose defects have been measured and corrected beforehand.

If the method is employed in the case of an appliance chain containing a plurality of appliances, such as a photo appliance and a scanner, the method produces formatted information related to both appliances. This is the case of a practical method for permitting the correction of defects of a photo appliance without having to know the defects of the scanner, in the case in which the images used by the present method and by the image-processing means were scanned with the same appliance.

For the correction proper of an arbitrary image derived from the appliance chain described in the foregoing, a simple example of implementation can be described as follows:

Reading of the formatted information related to the appliance chain and calculated beforehand. This formatted information contains in particular the parameterizable model described in the foregoing.

Reading of all the information of the format style—Exif, PIM or other—giving particulars about the set of adjustments of the appliance and/or of the appliance chain at the moment of filming (focal length, focusing, aperture, speed, flash, etc.). This information comprises values of variable parameters of the device and a part of the arguments of the parameterizable model. This information is generally indicated, for example, in the image headers.

Correction: For each point having coordinates (X,Y) on SR and corresponding to a point of the corrected image to be calculated, it is possible to compose a complete argument of the parameterizable model with the coordinates X,Y and the foregoing part of the arguments of the parameterizable model: (X, Y, focal length, distance, aperture, iso, speed, flash, etc.). It is then possible, by virtue of the formatted information, to calculate the coordinates of a point (X',Y') of the image to be corrected. The values of (X',Y') will not necessary be integral. The brightness associated with the point is then calculated by applying, for example, any interpolation technique (linear, bilinear, bicubic or other) to the brightness information taken at the point (X'Y') and its vicinity in the image to be corrected. This method is iterated for all the points of the image and for each color plane, in such a way as to obtain a defect-free image.

Figure 8:
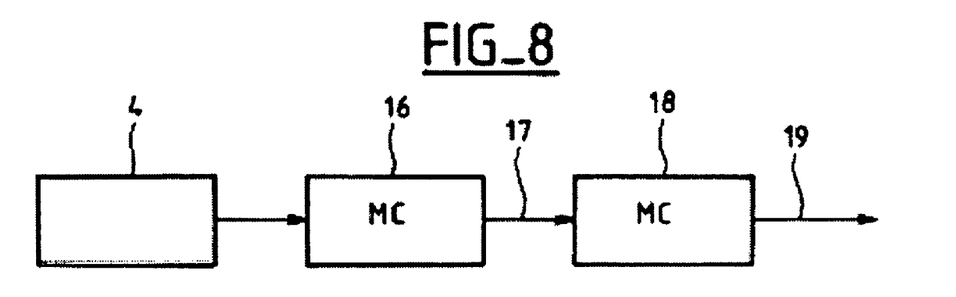

The system in FIG. 8 represents a form of employment of the invention described in the foregoing. A digitized color image plane 4 is processed by a first calculating means 16, which models and corrects the geometric anomalies of the said digitized color planes 4, in such a way as to obtain corrected digitized color planes 17. A second calculating means 18 combines the said corrected digitized color planes 17, in such a way as to obtain a color image 19 corrected completely or partly for the chromatic aberrations 1.

Calculation means 16 may also model and correct, at least partly, the said geometric anomalies composed of deviations 10, especially distortion, between the geometric defects 2, of the said digitized color planes 4, in such a way as to obtain corrected digitized color planes 17.

Figure 9:
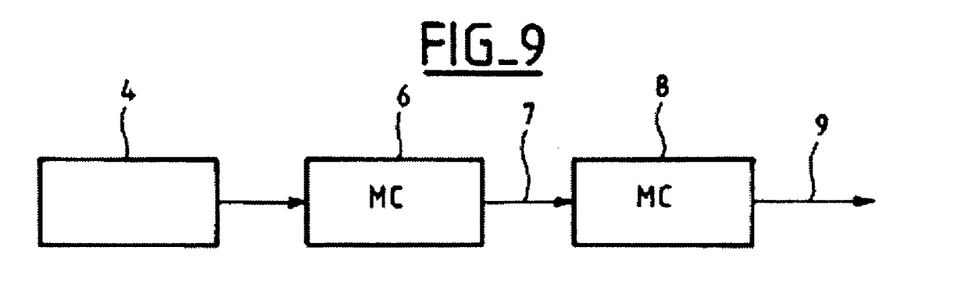

The system in FIG. 9 represents another form of employment of the invention described in the foregoing. Calculating means 6 are able to model and correct, at least partly, the geometric anomalies composed of distortion defects 2 of the said digitized color planes 4, in such a way as to obtain corrected digitized color planes 7, so that it is possible establish a correspondence between the said corrected digitized color planes 7.

Second calculating means 8 illustrated in FIG. 9 then make it possible, by combining the said corrected digitized color planes 7, to obtain a color image 9 corrected completely or partly for the chromatic aberrations 1 and/or the distortion defects 2.

The invention claimed is:

1. A method for correcting chromatic aberrations of a color image composed of a plurality of digitized color planes, the color image having been produced by means of an optical system, the method comprising:

modeling and correcting, at least partly, the geometric anomalies composed of deviations between geometric defects of the digitized color planes, to obtain corrected digitized color planes, wherein it is possible to establish a correspondence between the corrected digitized color planes; and combining the corrected digitized color planes to obtain a color image corrected completely or partly for the chromatic aberrations, wherein the step of modeling and correcting further comprises:

producing, by means of an appliance or an appliance chain, an image of a reference scene, the image exhibiting defects, producing, from the reference scene, a virtual reference, establishing a bijection between the image and the virtual reference, calculating projections of the virtual reference onto three digitized color planes R, G and B, using a same mathematical projection for each of the three digitized color planes, calculating formatted information comprising mathematical projections, and correcting the chromatic aberrations of the image based on the formatted information.

2. A method for correcting the distortion defects of a color image composed of a plurality of digitized color planes, the color image having been produced by means of an optical system and configured to correct distortion defects of the color image, the method comprising:

modeling and correcting, at least partly, the geometric anomalies composed of distortion defects of the digitized color planes, to obtain corrected digitized color planes, wherein it is possible to establish a correspondence between the corrected digitized color planes; and combining the corrected digitized color planes to obtain a color image corrected completely or partly the distortion defects, wherein the step of modeling and correcting further comprises:

producing, by means of an appliance or an appliance chain, an image of a reference scene, the image exhibiting defects, producing, from the reference scene, a virtual reference, establishing a bijection between the image and the virtual reference, calculating projections of the virtual reference onto three digitized color planes R, G and B, using a same mathematical projection for each of the three digitized color planes, calculating formatted information comprising mathematical projections, and correcting the distortion defects of the image based on the formatted information.

3. A system for correcting chromatic aberrations of a color image composed of a plurality of digitized color planes, the color image having been produced by an optical system;

the system comprising:

first calculating means for modeling and correcting geometric anomalies of the digitized color planes, to obtain corrected digitized color planes; and second calculation means for combining the corrected digitized color planes, to obtain a color image corrected completely or partly for the chromatic aberrations, wherein the first calculating means for modeling and correcting geometric anomalies further comprises:

first producing means for producing, by means of an appliance or an appliance chain, an image of a reference scene, the image exhibiting defects, second producing means for producing, from the reference scene, a virtual reference, establishing means for establishing a bijection between the image and the virtual reference, third calculating means for calculating projections of the virtual reference onto three digitized color planes R, G and B, using a same mathematical projection for each of the three digitized color planes, fourth calculating means for calculating formatted information comprising mathematical projections, and correcting means for correcting the distortion defects of the image based on the formatted information.

4. A system according to claim 3, wherein:

the first calculating means further for modeling and correcting, at least partly, the geometric anomalies composed of deviations between geometric defects of the digitized color planes to obtain corrected digitized color planes, wherein it is possible to establish a correspondence between the corrected digitized color planes; and the second calculating means further for combining the corrected digitized color planes to obtain a color image corrected completely or partly for the chromatic aberrations.

5. A system according to claim 3, configured to correct chromatic aberrations and distortion defects of the color image, the system further comprising:

first calculating means further for modeling and correcting, at least partly, the geometric anomalies composed of distortion defects of the digitized color planes to obtain corrected digitized color planes, wherein it is possible to establish a correspondence between the corrected digitized color planes; and second calculating means further for combining the corrected digitized color planes to obtain a color image corrected completely or partly for the chromatic aberrations and the distortion defects.

* * * * *